United States Patent
Yongfang et al.

(10) Patent No.: US 7,636,395 B2
(45) Date of Patent: Dec. 22, 2009

(54) METHOD AND DEVICE FOR SPLICING VIDEO DATA IN COMPRESSED DOMAIN

(75) Inventors: Liang Yongfang, Arlington, TX (US); Chebil Fehmi, Irving, TX (US); Islam Asad, Richardson, TX (US)

(73) Assignee: Nokia Corporation, Espoo (FI)

( * ) Notice: Subject to any disclaimer, the term of this patent is extended or adjusted under 35 U.S.C. 154(b) by 957 days.

(21) Appl. No.: 11/081,840

(22) Filed: Mar. 14, 2005

(65) Prior Publication Data

US 2006/0203920 A1    Sep. 14, 2006

(51) Int. Cl.
*H04N 7/12* (2006.01)
(52) U.S. Cl. .................................. 375/240.28
(58) Field of Classification Search ............. 375/240.28
See application file for complete search history.

(56) References Cited

U.S. PATENT DOCUMENTS

2003/0147469 A1*  8/2003  Byun, II ................. 375/240.25

* cited by examiner

*Primary Examiner*—Y. Lee
*Assistant Examiner*—Richard Torrente
(74) *Attorney, Agent, or Firm*—Alred A. Fressola; Ware, Fressola, Van Der Sluys & Adolphson LLP

(57) ABSTRACT

The present invention provides a method, a module, and a device, which enable splicing of MPEG-4 simple profile compatible bitstreams in compressed domain into a seamless bitstream. The method of the present invention enables splicing on devices with constraints in processing power, storage and memory capacity and limited electrical supply. The splicing is based on a mode and/or format translation operated both in compressed domain.

28 Claims, 6 Drawing Sheets

METHOD AND DEVICE FOR SPLICING VIDEO DATA IN COMPRESSED DOMAIN

TECHNICAL FIELD

The present invention relates to the field of digital video splicing. Particularly, the present invention addresses MPEG-4 and H.263 digital video compression standard.

BACKGROUND OF THE INVENTION

Digital video cameras are increasingly spreading among the marketplace. Beneath the typical digital video cameras, a growing number of portable CE devices provided with image capturing capability are applicable for capturing video sequences. The most popular portable CE devices with image capturing capability are digital cameras for still imaging enhanced with the possibility to shoot image sequences recorded as digital video clips and cellular phones equipped with image capturing sensors enabling the users shooting still image and making digital video clips.

Typically, digital video sequences are very large in file size. Even a short video sequence is composed of tens of images. Digital video cameras are conventionally adapted for recording such huge data volumes but are limited in video processing. Portable CE devices with image capturing capability such as digital cameras and cellular phones are limited in their storage provided for digital images and video clips. As a result, video is always saved and/or transferred in compressed form. There are several video-encoding techniques, which can be used for that purpose. MPEG-4 and H.263 are the most widely used standard compression formats especially also suitable for wireless cellular environments.

To allow users to generate quality video at their terminals, it is imperative that devices having a video camera, such as the aforementioned class of cellular phones, provide video editing capabilities. Video editing is the process of transforming and/or organizing available video sequences into a new video sequence. Splicing, i.e. merging, video clips is one of the most widely used editing operations, as users often wish to combine video clips. Merging video clips with various formats (MPEG-4 or H.263), or even with various coding modes within a format (different coding schemes of MPEG-4) requires bringing the clips to a common form.

When the MPEG-4 standard was developed and its profiles and levels were defined, the use case for merging video clips with different coding modes was not considered. MPEG-4 coded video clips with different coding modes cannot be concatenated. The state of the art solution to fix this problem requires fully decoding the sequences, splicing the sequences in spatial domain and re-encoding them again. More specifically, we first decompress the video clip, discard the unused frames, concatenate the remaining data, and then re-encode the generated uncompressed data. The major disadvantage of this approach is that it is significantly computationally costly, especially the encoding part, and requires huge storage capacity. The encoding is obviously a significantly computationally intensive operation for clips that, after all, have the same format, i.e., MPEG-4 format. Decoding video clips in portable CE devices can be obtained in real time; encoding them, however, cannot. To decode and encode clips of 10 minutes, the user would have to wait for more than 15 minutes in most portable CE devices, which is not practically acceptable.

SUMMARY OF THE INVENTION

This present invention provides a technique for performing efficient transcoding operations, in compressed domain, on MPEG-4 video clips to allow merging operations at portable CE devices underlying constraints in computational power, electrical empowerment, storage, and memory.

According to a first aspect of the present invention, a method for splicing two compressed input bitstreams being compatible with MPEG-4 simple compatible profile into a spliced output bitstream of MPEG-4 simple profile with packet resynchronization is provided. A compressed first input bitstream and a compressed second input bitstream are provided to being spliced. For each frame in the input bitstreams a mode translation in compressed domain is performed. A Video Object, Video Object Layer, Video Object Plane with packet resynchronization is established in the output bitstream. Data partitioning is removed, in case one of the input bitstreams uses partitioned data for error resilience, in that a first and second data partition are obtained and the data of each macro-block is rearranged. In case one of the input bitstreams uses reversible variable-length codes, each macro-block is re-encoded by reversible variable-length decoding, variable-length encoding, and including the macro-block into the output bitstream. Otherwise the transform coefficients included in the macro-block are copied to the output bitstream. The mode translation in compressed domain is performed for each macro-block in the video packet in the input bitstreams and for each video packet in the frame thereof. Timing information for each VOP in the bitstream and for each video packet in the VOP, where applicable, is adjusted to reflect continuity of frames in the spliced bitstream.

According to an embodiment of the invention, a format translation in compressed domain is performed for each frame in the input bitstreams. A Video Object, Video Object Layer, Video Object Plane with packet resynchronization is established in the output bitstream. The VOP time increment field is adjusted for each frame in the input bitstreams to correspond to the output VOP time increment resolution field. Each macro-block is transcoded in the frame. In case that a currently processed frame is an Intra macro-block or is an Intra frame, the DC and AC transform coefficients of the Intra macro-block are recoded and the recoded coefficients are included into the output bitstream. In case that a currently processed frame is an Inter macro-block or an Intra frame without ESCAPE codes, the transform coefficients are copied to the output bitstream. Otherwise; i.e. in case that the currently operated frame is an Inter macro-block with ESCAPE codes; the variable length codes are recoded to enable the inclusion of the macro-block into the output bitstream.

According to another embodiment of the present invention, the transcoding of each macro-block is performed in that the Coded Macro-Block Indication (COD) is included into the output bitstream, in case that the currently processed macro-block is an un-coded macro-block.

According to yet another embodiment of the present invention, the recoding of the DC and AC transform coefficients is performed in that the DC coefficients are de-quantized and re-quantized, a DC prediction is performed, and the AC coefficients are subjected to entropy de-coding and variable-length coding using the MPEG-4 variable-length code table.

According to a further embodiment of the present invention, the recoding of the variable length codes is operated in that the AC transform coefficients are subjected to variable-length de-coding and variable length re-encoding such that ESCAPE codes are removed.

According to yet a further embodiment of the present invention, the format translation is operable in that the Coded Macro-Block Indication (COD) is included into the output bitstream in case that the currently processed macro-block is an un-coded macro-block.

According to an additional embodiment of the present invention, the time reference is adapted. The adaptation of the time reference relates to both the time reference in the VOL header as well as in such Video Packet Headers that have the Header Extension Code (HEC) bit enabled. The time reference adjustment is applicable to provide for continuity of the spliced bitstream formed of the input bitstreams.

According to an additional embodiment of the present invention, in case that a P (predictive) frame is present at a spliced position in the second bitstream, which is to be appended to the first bitstream, the P-frame is converted into an I-frame since P-frames are not independent from the preceding frames whereas I-frames are independent; i.e. I-frame can be decoded independently for any other ones. Hence splicing of the input frames is enabled. The conversion results in an I-frame having the target mode and target format of the output bitstream desired.

According to yet an additional embodiment of the present invention, the format translation is performed in case that one of the (both) input bitstreams is coded in accordance with short video header (SVH) MPEG-4 standard. Otherwise mode translation is performed.

According to a second aspect of the present invention, a computer program product, which may comprise a computer readable medium, and a computer data signal for splicing two compressed input bitstreams being compatible with MPEG-4 simple profile compatible into a spliced output bitstream of MPEG-4 simple profile with packet resynchronization is provided. The computer program product and the computer readable medium comprise code sections including one or more instructions for being executed on a processing device. Likewise, the computer data signal represents instructions of code sections for being executed on a processing device. The code sections and the instructions enable performing of the aforementioned method.

The computer program product or computer data signal includes a code section for receiving a compressed first input bitstream and a compressed second input bitstream. Both input bitstreams are to be spliced or merged. A further code section is provided to enable mode translation in compressed domain of each frame in the input bitstreams. A code section allows for establishing a Video Object, Video Object Layer, and Video Object Plane with packet resynchronization (target mode) in the output bitstream, which is intended for including at least parts of both input streams spliced in sequence. A code section is adapted to enable to adjust the VOP time increment field for each frame in the input bitstreams in order to correspond to the output VOP time increment resolution field. In case that at least one of the input bitstreams uses partitioned data error resilience, a code section provided removes the data partitioning in that a first data partition and second data partition are obtained and the data of each macro-block is rearranged. In case that at least one of the input bitstreams uses Reversible Variable-Length Codes (RVLC), a code section provided re-encoded each macro-block in that reversible variable-length decoding, variable-length decoding is performed on each macro-block, and the macro-block is of the input included into the output bitstream. Otherwise, a code section provided copies the transform coefficients (AC, DC), which are included in the macro-block(s), to the output bitstream. It should be understood that the mode translation in compressed domain as described above is performed for each macro-block in the Video Packet in the input bitstreams and for each Video Packet in the frame thereof.

According to an embodiment of the present invention, a code section for performing a format translation in compressed domain for each frame in the (both) input bitstreams is provided. A code section enables that a Video Object, Video Object Layer, Video Object Plane with packet resynchronization is established in the (target) output bitstream. Then a code section adjusts the VOP time increment field for each frame in the input bitstreams such that the VOP time increment field of the frames in the input bitstreams correspond to the VOP time increment resolution field in the output bitstream. A code section provided transcodes each macro-block in the frame. In case the currently processed frame is an Intra macro-block, a code section provided recodes the DC and AC transform coefficients of the Intra macro-block and includes the recoded coefficients into the output bitstream. In case the currently processed frame is an Inter macro-block without ESCAPE codes, a code section provided serves for copying the transform coefficients to the output bitstream. Otherwise; i.e. in case that the currently processed frame is an Inter macro-block with ESCAPE codes; a code section provided recodes the Variable Length Codes such that the macro-block is includable into the output bitstream.

According to another embodiment of the present invention, the code section provided for transcoding each macro-block comprises a code section which includes the Coded Macro-Block Indication (COD) into the output bitstream, in case that the currently processed macro-block is an un-coded macro-block.

According to yet another embodiment of the present invention, the code section provided for recoding DC and AC transform coefficients comprises code sections to de-quantize and re-quantize the DC coefficients to perform DC prediction, and to entropy de-code and variable-length code the AC coefficients by usage of the MPEG-4 variable-length code table.

According to a further embodiment of the present invention, the code section provided for recoding the variable length codes comprises in addition a code section to enable variable-length decoding and variable length re-coding of the AC transform coefficients such that the ESCAPE codes are removed.

According to yet a further embodiment of the present invention, the code section for format translation comprises a code section which allows for including the Coded Macro-Block Indication (COD) into the output bitstream in case that the currently processed macro-code is an un-coded macro-block.

According to an additional embodiment of the present invention, a code section is provided to adapt the time reference in the VOL header and in such Video Packet Headers, which have the Header Extension Code (HEC) bit enabled. The adaptation is performed to provide for continuity of the spliced bitstream formed of the input bitstreams.

According to yet an additional embodiment of the present invention, a code section is provided which converts the P-frame to an I-frame such that splicing of the input frames is possible in case the currently processed P (predictive) frame at the spliced position in the second bitstream to be appended to the first bitstream; i.e. that position, at which the input bitstreams are in touch with each other. The conversion results in an I-frame having the target mode and target format of the output bitstream.

According to another additional embodiment of the present invention, the format translation is performed in case that one of the (both) input bitstreams is coded in accordance with short video header (SVH) MPEG-4 standard. Otherwise mode translation is performed.

According to a third aspect of the present invention, a module for splicing two compressed input bitstreams being compatible with MPEG-4 simple profile compatible into a spliced output bitstream of MPEG-4 simple profile with packet resynchronization and an electronic device comprising the module is provided.

The module includes an input for receiving a compressed first input bitstream and a compressed second input bitstream to be spliced. A mode translator is provided and capable for performing for each frame in the input bitstreams a mode translation in compressed domain in that a Video Object, Video Object Layer, and Video Object Plane with packet resynchronization are established in the output bitstream. Data partitioning (an error resilience methodology in MPEG-4) is removed, if the one of the input bitstreams uses partitioned data error resilience, in that a first and a second data partition are obtained and the data of each macro-block is rearranged. If one of the input bitstream uses reversible variable-length codes, each macro-block is re-encoded by reversible variable-length decoding, variable-length re-coding, and including the macro-block into the output bitstream. Otherwise, transform coefficients included in the macro-block are copied to the output bitstream. The mode translation in compressed domain is performed for each macro-block in the video packet in the input bit streams and for each video packet in the frame thereof. Timing information for each VOP in the bitstream and for each video packet in the VOP, where applicable, is adjusted to reflect continuity of frames in the spliced bitstream.

According to an embodiment of the present invention, the module comprises a format translator, which is provided to enable format translation in compressed domain for each frame in the input bitstreams. A Video Object, Video Object Layer, and Video Object Plane with packet resynchronization are established in the output bitstream. The VOP time increment field for each frame in the input bitstreams is adjusted to correspond to the output VOP time increment resolution field. Each macro-block is transcoded in the frame. In case the currently processed macro-block is an Intra macro-block, DC and AC transform coefficients of the Intra macro-block are re-coded and the recoded coefficients are included into the output bitstream. In case the currently processed macro-block is an Inter macro-block without ESCAPE codes, the transform coefficients are copied to the output bitstream; and otherwise; i.e. in case the current macro-block operated on is an Inter macro-block with ESCAPE codes, the variable length codes are re-coded to enable inclusion of the macro-block into the output bitstream.

According to another embodiment of the present invention, the module comprises additionally a time reference modifier, which adapts in both VOL header as well as in such Video Packet Headers that have the Header Extension Code bit enabled the time reference in order to ensure continuity of the spliced bitstream formed of the (both) input bitstreams.

According to yet another embodiment of the present invention, the module comprises a frame converter, which is provided to enable conversion of the P-frame into an I-frame such that the input frames, in case of a P (predictive) frame at spliced position in the second bitstream to be appended to the first bitstream, can be spliced. The conversion results in an I-frame with desired target mode and format of the output bitstream.

Those skilled in the art will appreciate on the basis of the teaching given above, that the functions and functionalities of the mode translator, format translator, time reference modifier, frame converter, and further components of the module are disclosed in detail with reference to the method according to an embodiment of the present invention.

According to a fourth aspect of the present invention, a processing device and especially a portable CE device with processing capability is provided, which includes at least a module for splicing two compressed input bitstreams being compatible with MPEG-4 simple profile compatible into a spliced output bitstream of MPEG-4 simple profile with packet resynchronization. The module of the device corresponds to a module according to an embodiment of the present invention described above.

BRIEF DESCRIPTION OF THE DRAWINGS

Other and further aspects of the present invention will become apparent during the course of the following description and by reference to the attached drawings, in which.

DETAILED DESCRIPTION

In the following description of the various embodiments, reference is made to the accompanying drawings which form a part thereof, and in which is shown by way of illustration various embodiments in which the invention may be practiced. It is to be understood that other embodiments may be utilized and structural and functional modifications may be made without departing from the scope of the invention. Wherever possible, the same reference numbers are used throughout drawings and description to refer to similar or like parts.

Figure 1A:
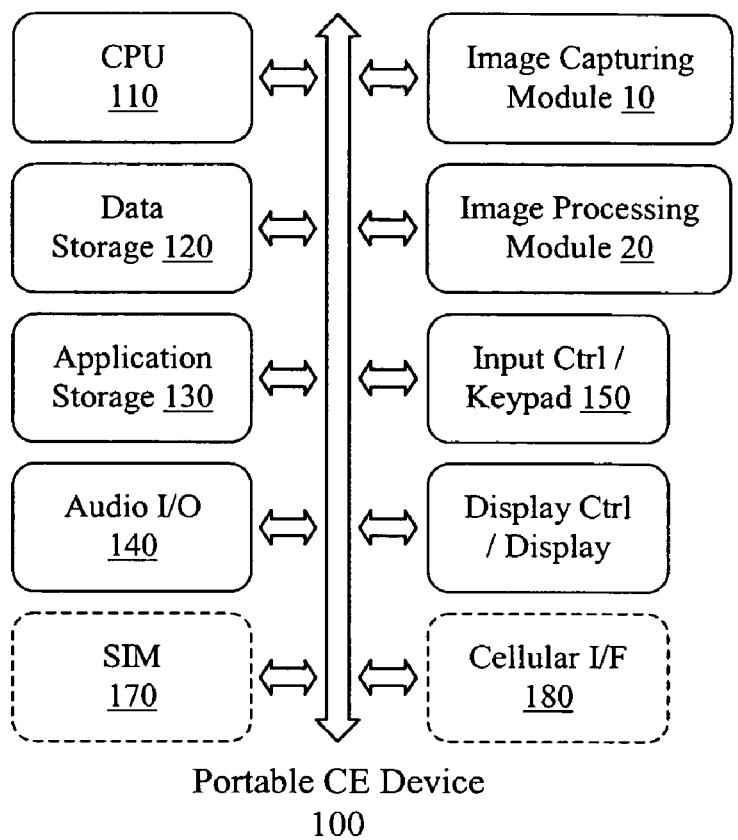
FIG. 1a illustrates schematically a first exemplary portable CE device with image capturing capability according to an embodiment of the present invention.

The block diagram of FIG. 1a illustrates principal structural components of a portable consumer electronic (CE) device 100, which should exemplarily represent any kind of portable consumer electronic (CE) device employable with the present invention. It should be understood that the present invention is neither limited to the illustrated CE device 100 nor to any other specific kind of portable CE device.

The illustrated portable CE device 100 is exemplarily carried out as a camera phone, which designates typically a cellular phone with image and video clip capturing capability by the means of an image capturing sensor. In particular, the device 100 is embodied as a processor-based or micro-controller based device comprising a central processing unit (CPU) 110, a data storage 120, an application storage 130, cellular communication means including cellular radio frequency interface (I/F) 180 with radio frequency antenna (not shown) and subscriber identification module (SIM) 170, user interface input/output means including audio input/output (I/O) means 140 (typically microphone and loudspeaker), keys, keypad and/or keyboard with key input controller (Ctrl) 150 and a display with display controller (Ctrl) 160, an image capturing sensor 10 including typically a CCD (charge-coupled device) sensor (not shown) with optics (not shown) for image projection, and an image processing module 20 representing exemplarily an implementation of several dependent and independent modules and components required for image handling.

The operation of the CE device 100 is controlled by the central processing unit (CPU) 110 typically on the basis of an operating system or basic controlling application controlling the features and functionality of the CE device by offering their usage to the user thereof. The display and display controller (Ctrl) 160 are controlled by the central processing unit (CPU) 110 and provides information for the user. The keypad and keypad controller (Ctrl) 150 are provided to allow the user to input information. The information input via the keypad is supplied by the keypad controller (Ctrl) to the central processing unit (CPU) 110, which may be instructed and/or controlled in accordance with the input information. The audio input/output (I/O) means 140 includes at least a speaker for reproducing an audio signal and a microphone for recording an audio signal. The central processing unit (CPU) 110 may control the conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry.

Additionally, the portable CE device 100 according to a specific embodiment illustrated in FIG. 1a includes optionally the cellular interface (I/F) 180 coupled to the radio frequency antenna and is operable with the subscriber identification module (SIM) 170. The cellular interface (I/F) 180 is arranged as a cellular transceiver to receive signals from the cellular antenna, decodes the signals, demodulates them and also reduces them to the base band frequency. The cellular interface 180 provides for an over-the-air interface, which serves in conjunction with the subscriber identification module (SIM) 170 for cellular communications with a corresponding base station (BS) of a radio access network (RAN) of a public land mobile network (PLMN). The output of the cellular interface (I/F) 180 thus consists of a stream of data that may require further processing by the central processing unit (CPU) 110. The cellular interface (I/F) 180 arranged as a cellular transceiver is also adapted to receive data from the central processing unit (CPU) 110, which is to be transmitted via the over-the-air interface to the base station (BS of the radio access network (RAN). Therefore, the cellular interface (I/F) 180 encodes, modulates and up converts the data embodying signals to the radio frequency, which is to be used. The cellular antenna then transmits the resulting radio frequency signals to the corresponding base station (BS) of the radio access network (RAN) of the public land mobile network (PLMN).

The image capturing sensor 10 is typically implemented by the means of a CCD (charge-coupled device) and optics. Charge-coupled devices containing grids of pixels are used for digital image capturing in digital cameras, digital optical scanners, and digital video cameras as light-sensing devices. An image is projected by optics (a lens or an arrangement of one or more lenses) on the capacitor array (CCD), causing each capacitor to accumulate an electric charge proportional to the light intensity at that location. A two-dimensional array, used in digital video and digital still cameras, captures the whole image or a rectangular portion of it. Once the array has been exposed to the image, a control circuit causes each capacitor to transfer its contents to its neighbor. The last capacitor in the array dumps its charge into an amplifier that converts the charge into a voltage. By repeating this process, the control circuit converts the entire contents of the array to a varying voltage, which it samples, digitizes, and provides the raw image data for further handling by the image processing module 20. The image processing module 20 enables the user of the CE device 100 to shoot still digital images and video sequences. Conventionally, the raw image data is compressed by the image processing module 20 and stored in the data storage. The image processing module 20 implements among others the codecs, i.e. coding and encoding modules required for still digital image processing and video (image sequence) processing, where the implemented components of the image processing module 20 are preferably software application components, which operation may be supported by specific hardware implementation, which is advantageous to improve processing capability and functionality of the image processing module 20.

Recently CMOS image sensors have become popular and are on the way to generally replace the CCDs for image capturing. The CMOS image sensors can be produced using the CMOS manufacturing process which is the dominant technology for all chip-making, CMOS image sensors are cheap to make and signal conditioning circuitry can be incorporated into the same device. It should be understood that the present invention is not limited to a specific image capturing sensor.

Figure 1B:
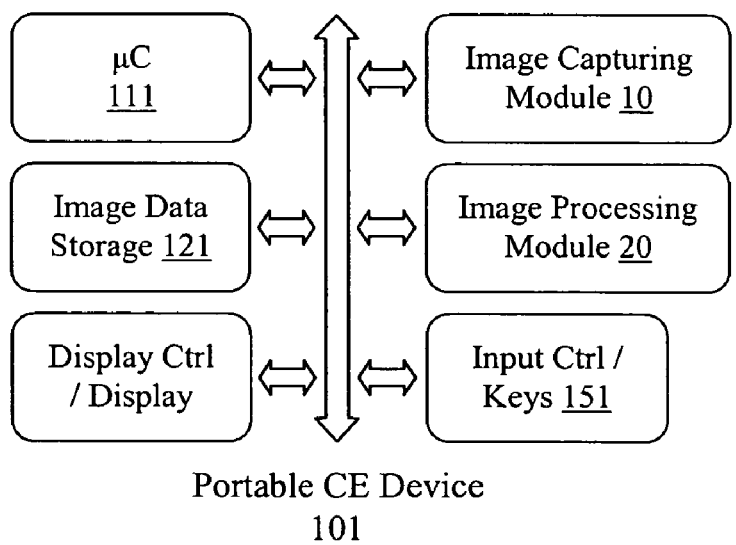
FIG. 1b illustrates schematically a second exemplary portable CE device with image capturing capability according to an embodiment of the present invention.

The block diagram of FIG. 1b illustrates principle structural components of a portable consumer electronic (CE) device 101, which should exemplarily represent any kind of portable consumer electronic (CE) device employable with the present invention.

The illustrated portable CE device 101 is exemplarily carried out as a digital camera enabling the user for digital image capturing. Modern digital cameras are conventionally optimized for still digital imaging. Nevertheless the capability of video clip recording is often an additional feature implemented in digital cameras. In particular, the device 101 is embodied as micro-controller (μC) based device comprising a micro-controller (μC) 111, a image data storage 121, user interface input/output means including keys coupled to the micro-controller (μC) 111 via a key input controller (Ctrl) 151 and a display with display controller (Ctrl) 161, an image capturing sensor 10 including typically a CCD (charge-coupled device) or CMOS image sensor (not shown) with optics (not shown) for image projection, and an image processing module 20 representing exemplarily an implementation of several dependent and independent modules and components required for image handling. The operation of the CE device 101 is controlled by the micro-controller (μC) 111, which controls the operation of the implemented components. The user is allowed to interact with the CE device 101 by key input, which effects functions of the CE device 101. Conventionally, such CE devices 101 are fixed in their operations in contrast to a processing-based CE device. The implementation of digital cameras is well known in the art, and implementation details are out of the scope of the present invention.

Nevertheless, the implementation of the image capturing sensor 10, either hard-wired or software application based, may offer the same functionality to the user.

It should be noted that the inventive concept illustrated below on the basis of exemplary embodiments is in principle operable on any micro-processor based or micro-controller based device, which is adapted to enable the inventive concept or allows adaptation to the inventive concept; for instance by software application or hardware modification/implementation.

With reference to H.263 and MPEG-2, performing video splicing in the compressed domain is known. The splicing of video clips requires modification of the time reference and frame conversion. To provide the continuity, when stitching two clips, the time reference of each frame in each video clip is usually transformed to a common time scale. Depending on the cutting position, frame conversion may be required for I, P, B frames. Otherwise, a simple bit-stream level copy-and-paste operation is performed.

However, the splicing operation becomes more complex for MPEG-4 simple profile splicing. Simple profile compatible MPEG-4 bit-streams support several coding modes and formats. When stitching simple profile compatible MPEG-4 bit-streams, other than the time reference modification and frame conversion, we need mode translation and possible format transcoding that may be MPEG-4 to H.263 or H.263 to MPEG-4, depending on the particular application.

To explain the inventive concept of the present invention in detail, it is necessary to first provide a brief overview of a typical video compression/decompression structure.

In order to perform efficiently, video compression techniques exploit spatial redundancy in the frames forming the video. First, the frame data is transformed to another domain, such as the discrete cosine transform (DCT) domain, to decorrelate it. The transformed data is then quantized and entropy coded.

In addition, the compression techniques exploit the temporal correlation between the frames. This means, when coding a frame, the previous, and eventually the succeeding frames(s) are utilized which allows a significant reduction in the amount of data to be compressed. The information representing the changes in areas of a frame can be sufficient to represent a consecutive frame. This is called prediction and the frames coded in this way are called predicted (P) frames or Inter-frames. As the prediction cannot be 100% accurate (unless the changes undergone are described in every pixel), a residual frame representing the errors is also used to compensate the prediction procedure. The prediction information is usually represented as vectors describing the displacement of objects in the frames. These vectors are called motion vectors. The procedure to estimate these vectors is called motion estimation. The usage of these vectors to retrieve frames is known as motion compensation. Prediction is often applied on blocks within a frame. The block sizes vary for different algorithms (e.g. 8 by 8 or 16 by 16 pixels). Some blocks change significantly between frames. Consequently, it is better in this case to send all the block data independently from any prior information, i.e. without prediction. These blocks are called Intra-blocks.

Today, the most widely used and successful video codec (coding/decoding) standards are H.263, MPEG-2, and MPEG-4. These codecs were designed for different applications. The draft ITU-T standard H.263 was designed for low bit-rate communication, while MPEG-2 aimed to provide for broadcast of quality full-screen video. The intention of MPEG-4 is to provide a compression scheme suitable for low coding bit-rate with better video quality and more interactivity. It is, therefore, becoming more and more popular, especially in the applications for wireless hand-held and portable CE devices.

Due to its relatively simple coding complexity, H.263 is widely used in power constraint CE devices to enable simple video processing functionality. A large number of commercial products using H.263 are available already. As the processing power in portable CE devices quickly increases, MPEG-4 becomes more popular since it enhances the coding efficiency with better video quality. To provide forward compatibility with video codecs designed using the earlier video coding specification H.263, the MPEG-4 simple profile specifies the short video header (SVH) format, and all decoders, which support MPEG-4 simple profile, are required to support the SVH format. Indeed, SVH format is a H.263 bit-stream wrapped in one additional sequence header. In order to be able to handle such H.263 video clips, which may be generated by for instance last generation cellular phones with image capturing capability, it is also important to provide MPEG-4 and H.263 video splicing, as well as mode translation thereof.

As aforementioned, splicing uncompressed video is obvious, just discard the unused frames, if any, and concatenate the remaining data. Applying this methodology to compressed video clips, the compressed video clips are first decoded, spliced, and then re-encoded. With this methodology, each frame of each individual video clip must be fully decoded and then completely re-encoded in the spliced video clip. Because of the constraints of limited processing power and memory, this direct approach is not feasible in portable CE devices. Thus, it is desirable to perform the operation in the compressed domain.

In MPEG-4, different profiles and levels are defined to provide well-defined and well-chosen conformance points, ensuring interoperability between different implementations and allowing conformance to the standard to be tested. Among the profiles, simple profile defines an error-resilient, rectangular natural video object. Simple profile enables the use of simple and inexpensive coding tools, such as I/P-frame structure and error resilience tools. Three error-resilience tools are specified in MPEG-4 simple profile, which include Packet-based periodic resynchronisation, Data Partitioning (DP), and Reversible Variable-Length Codes (RVLCs). RVLCs are only available when DP is enabled, while packet-based resynchronization and DP are independent. Moreover, MPEG-4 simple profile also provides backward compatibility to H.263, using MPEG-4 short header format.

As a result, including the MPEG-4 short header, which is for backward compatibility with H.263, we may have the following possible coding modes for MPEG-4 simple profile bit-stream:

Mode 1: Regular MPEG-4
Mode 2: MPEG-4 short header
Mode 3: MPEG-4 with packet resynchronization
Mode 4: MPEG-4 with Data Partitioning (DP)
Mode 5: MPEG-4 with Data Partitioning (DP) and RVLCs
Mode 6: Packet resynchronized MPEG-4 with Data Partitioning (DP)
Mode 7: Packet resynchronized MPEG-4 with Data Partitioning and RVLCs Modes 1, 2, and 7 are the most common ones used. An MPEG-4 compliant bitstream can have only one mode inside it. Since different coding modes may exist when splicing two MPEG-4 simple profile bit-streams, the bit-streams cannot be simply concatenated. Rather, mode translation and format translation for short header are required.

Therefore, a common coding mode needs to be specified. As can be seen from above, there are several coding modes that can be chosen as the output mode of MPEG-4 video splicing. The present invention relates to the use of mode 3 as target mode: "MPEG-4 with packet resynchronisation" as the target-coding mode. In this mode, resynchronisation markers are used to re-establish the synchronization between the decoder and the bit-stream after an error has been detected. In practice, this mode is not commonly used alone in the encoder. Moreover, the mode 4 is generally combined with DP or RVLCs to provide better error resilience to channel error. But it is a legal MPEG-4 simple profile bit-stream. As the target-coding mode, following advantages can be identified:

Regular MPEG-4 (mode 1) is a special case of MPEG-4, in which the entire frame consists of a single Video Packet without Video Packet Header, which is replaced by the VOP (Video Object Plane) header. To translate regular MPEG-4 (mode 1) into the target mode (mode 3), merely a bit-stream copying operation is required.

For MPEG-4 short header (mode 2), each GOB (group of Macro-Blocks (MBs)) can be mapped into one Video Packet, and Macro-Block (MB) level bit-stream transcoding can be performed. Detailed information will be provided below.

Other modes (mode 4~mode 7) implicitly use packet resynchronization. Therefore, merely bit-stream rearranging operation is required for data partitioned bit-stream, and variable-length decoding (deVLC)/variable-length coding (VLC) for bit-streams using Reversible Variable-Length Codes (RVLCs).

Actually, the target mode proposed herein is the optimal mode that requires the least computational requirements and the best video quality. Other advantages also exist for using this mode as the preferred output mode. These are described below.

It should be noted that MPEG-4 short header is not a desirable format because expensive format translation for other modes has to be performed. Regular MPEG-4 is also not a desirable optimal target mode. MPEG-4 uses a two-bit field (DQUANT) to define a change in the quantization factor. The value of DQUANT ranges from −1 to 2. In packet resynchronized MPEG-4, the frame is divided into Video Packets. In the header of each Video Packet, a 5 bit field "quant_scale" (QUANT) will be used to update the quantization factor. In contrast, the 5 bit field "quant_scale" (QUANT) only exists in the VOP (Video Object Plane) header. Therefore, when the difference between the current QUANT (5 bits) and the last QUANT (5 bits) of the previous Video Packet is beyond the range of DQUANT (2 bits), the residual of this Macro-Block (MB) cannot be reused. A new QUANT is required, which implies that dequantization and re-quantization are required. Moreover, rate control may be needed to ensure the output bit does not change too much because of the change of QUANT. This effect will propagate throughout this Video Packet. In addition, for packetized MPEG-4 bit-stream, the predictions (DC/AC, MV) cannot exceed the frame and Video Packet boundary. To translate it into regular MPEG-4, the predictions have to be determined once again. All the above re-coding operations not only introduce extra computation complexity, but also decrease the video quality. Since data partitioned bit-streams (MPEG-4 using Reversible Variable-Length Codes (RVLCs) also fall in this category) are mainly used for communication purpose, they are not in general the main input modes in practical video splicing applications. Practically, data partitioned bit-stream mode is not preferred.

In order to make video transcoding more efficient and flexible, the video transcoding is done at Macro-Block (MB) level, in which sufficient data to process one MB is available. The bit-stream position is saved from the video object (VO) (picture) level to the Macro-Block (MB) syntax level.

Figure 2:
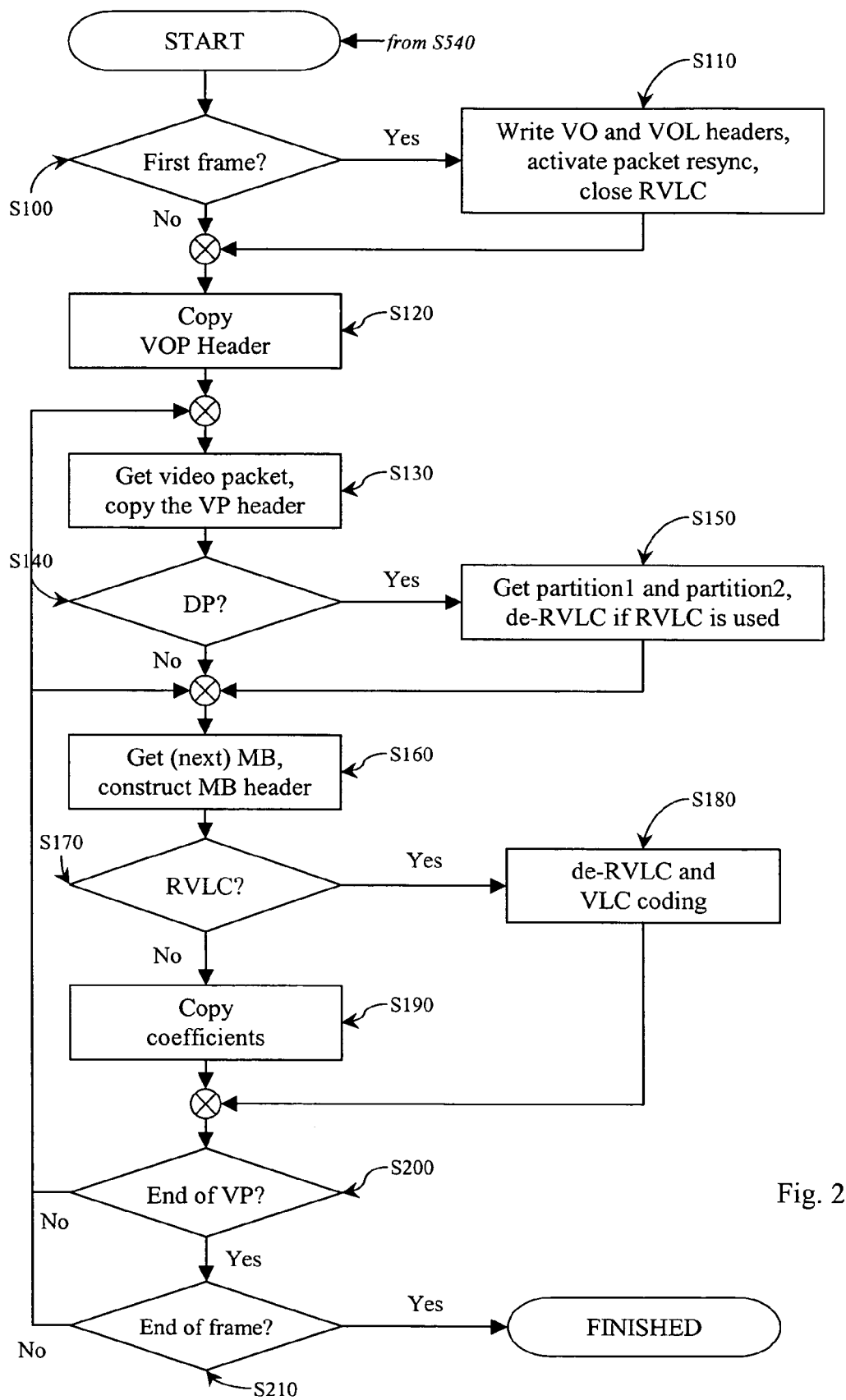
FIG. 2 illustrates schematically an operation sequence for translation of one frame into MPEG-4 mode according to an embodiment of the present invention.

The implementation of mode translation is discussed in detail with reference to FIG. 2, which illustrates schematically an operation sequence for translation of one frame into MPEG-4 mode according to an embodiment of the present invention.

In operation S100, it is determined whether the current frame to be operated on is a first frame. In case this is true, the sequence proceeds with an operation S110. The VO (video object) and VOL (video object layer) header are written and the regular MPEG-4 bit "resync_marker_disable" is set to zero in order to enable MPEG 4 with packet resynchronization (cf. MPEG-4 mode 3). The reversible variable-length coding (RVLC) is closed. Subsequent to operation S110 and in case the current frame is not a first frame, respectively, the sequence continues with operation S120, where the VOP (video object plane) header is copied. Then, the Video Packet (VP) is obtained and the VP (Video Packet) header is copied in operation S130. If timing information is to be adjusted in the Video Packet header, as indicated by the Header Extension Code field, then the vop_time_increment_resolution field is adjusted.

In following operation S140, it is checked whether the data partitioning is present. In case of data partitioning, a first partition "partition1" and a second partition "partition2" are obtained and merged in operation S150. In case reversible variable-length coding (RVLC) is used, reversible variable-length decoding (deRVLC) is also performed in operation S150. Otherwise or in case of no data partitioning, the sequence continues with operation S160.

In operation S160, a Macro-Block (MB) is obtained and the Macro-Block header (MB) is generated. Then, in operation S170, it is determined whether reversible variable-length coding is present. In case of reversible variable-length coding, reversible variable-length decoding (de-RVLC) is performed and subsequently variable-length coding (VLC) is performed in operation S180. The sequence branches thereafter to an operation S200. In case reversible variable-length coding (RVLC) is not present, the coefficients are copied in an operation S190 and the sequence continues with operation S200, where it is checked whether the end of the Video Packet (VP) has been reached.

If the end of the VP has not reached, the sequence returns to operation S160 in order to operate the next Macro-Block (MB) as aforementioned. Otherwise, in succeeding operation S210, it is checked whether the end of the frame has been reached. In case the processing has reached the end of the frame, the translation of the frame into MPEG-4 mode is finished. Otherwise, the sequence returns to operation S130, where the next Video Packet is obtained for processing as aforementioned.

In brief, the above presented operation sequence selects the regular MPEG-4 mode with packet resynchronization (i.e. "resync marker_disable" bit set to zero), which corresponds to the aforementioned MPEG-4 mode 3. In case of data partitioning (cf. MPEG-4 mode 6), the Macro-Block (MB) data is rearranged and in case of data partitioning with Reversible Variable-Length Codes (RVLCs) (cf. MPEG-4 mode 7), the Macro-Block (MB) data is rearranged and variable-length coding (VLC) is performed.

Figure 3:
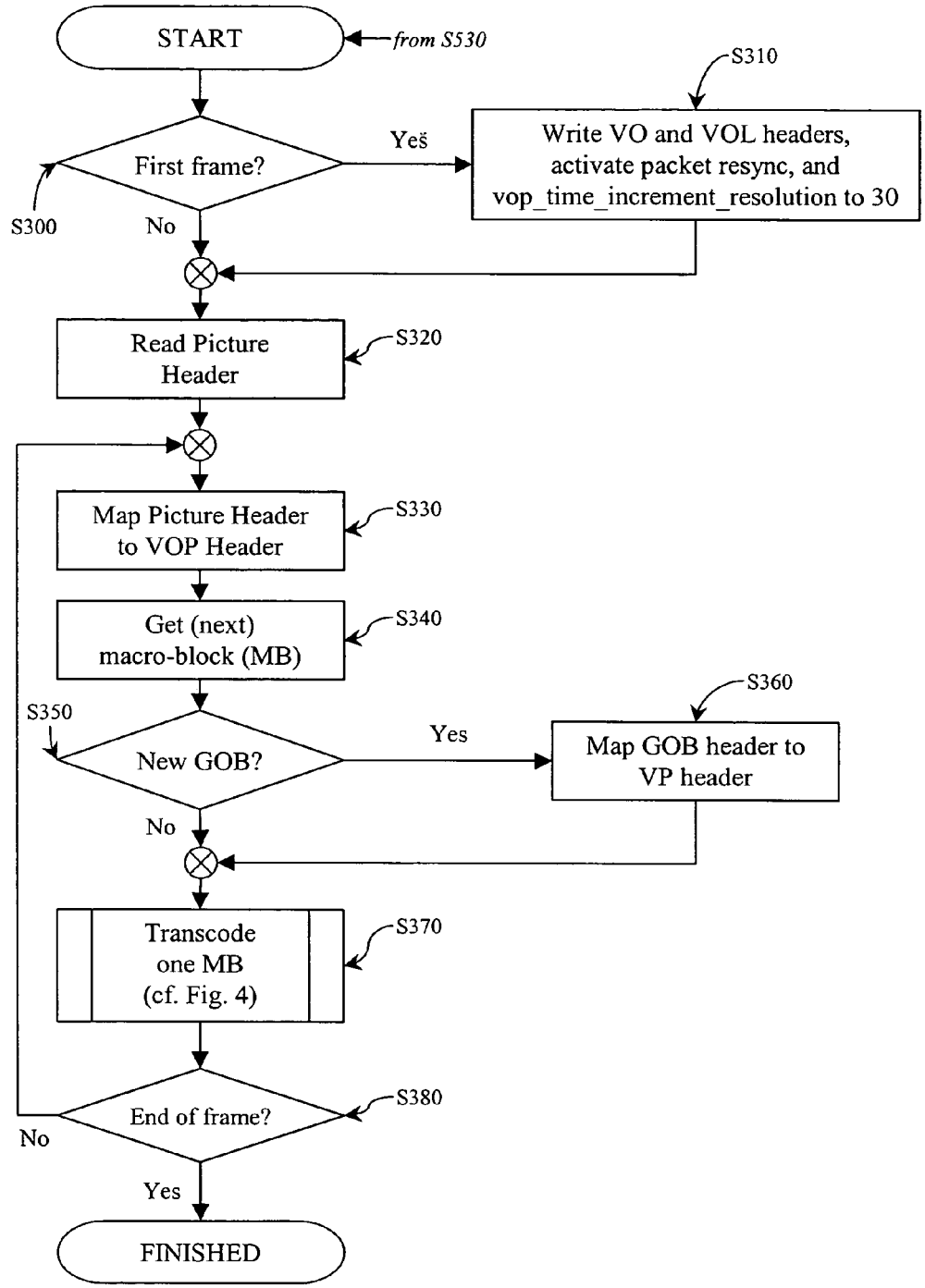
FIG. 3 illustrates schematically an operation sequence for H.263 to MPEG-4 format translation on frame level according to an embodiment of the present invention.

Format transcoding occurs between MPEG-4 short header and other MPEG-4 simple profile coding modes. FIG. 3 illustrates schematically an operation sequence for H.263 to MPEG-4 format translation on frame level according to an embodiment of the present invention.

In a first operation S300, it is checked whether the current frame to be operated on is a first frame. In case it is, the VO (video object) short header of the MPEG-4 short header bitstream is removed so that a baseline H.263 bit-stream is obtained. Then, VO (video object) and VOL (video object layer) headers are written. The regular MPEG-4 bit "resync_marker_disable" is set to zero in order to enable MPEG-4 with packet resynchronization (cp. with target mode) and the header information "vop_time_increment_resolution" is set to a fixed value. The "vop_time_increment_resolution" defines the range of the information "vop_time_increment", which is defined as [0, vop_time_increment_resolution]. MPEG-4 defines the width of the vop_time_increment_resolution field to be anywhere from 1 to 16 bits, so that the effective value of this field is in the range [1-65535]. The value zero is forbidden. For this invention, we can use any of the allowed values for this field. One embodiment of the invention uses a vop_time_increment_resolution value of 30,000. However, the scope of this invention is not limited to any specific value and any valid value for this field can be used for this invention. The sequence continues with operation S320, which is also the subsequent operation when the frame currently operated on is not a first frame. In operation S320, the picture header is read and then mapped to the VOP header in next operation S330. This means, for each frame in the short header bit-stream, certain information from the picture header is collected to generate a VOP (video object plane) header for each frame.

The vop_time_increment_resolution field is used in the VOL (Video Object Layer) header. If Video Packets are used to construct macro-block data and if the Header Extension Code (HEC) bit is set to 1 in the Video Packet header, then the vop_time_incrementfield is also present in the Video Packet header. This field must be adjusted in a similar manner as described above in order to correctly reflect the timing adjustments in the MPEG-4 VOP bitstream.

A Macro-Block (MB) is obtained in operation S340 and, next, it is verified in operation S350, whether a new GOB (group of Macro-Blocks) is present. In case of a new GOB, the GOB header is mapped to the Video Packet (VP) header in operation S360. Otherwise, the Macro-Block is supplied to the transcoding sub-procedure (cf. detailed description of the operation sequence below) in operation S370. After returning from the MB transcoding, it is verified in operation S380, whether the end of the frame has been reached. In case the verification matches, the operation sequence is completed. Otherwise, the sequence returns to operation S340 to obtain the next Macro-Block (MB) of the frame for MB transcoding.

In brief, each GOB is mapped to one Video Packet, and a corresponding Video Packet Header will be generated too.

Figure 4:
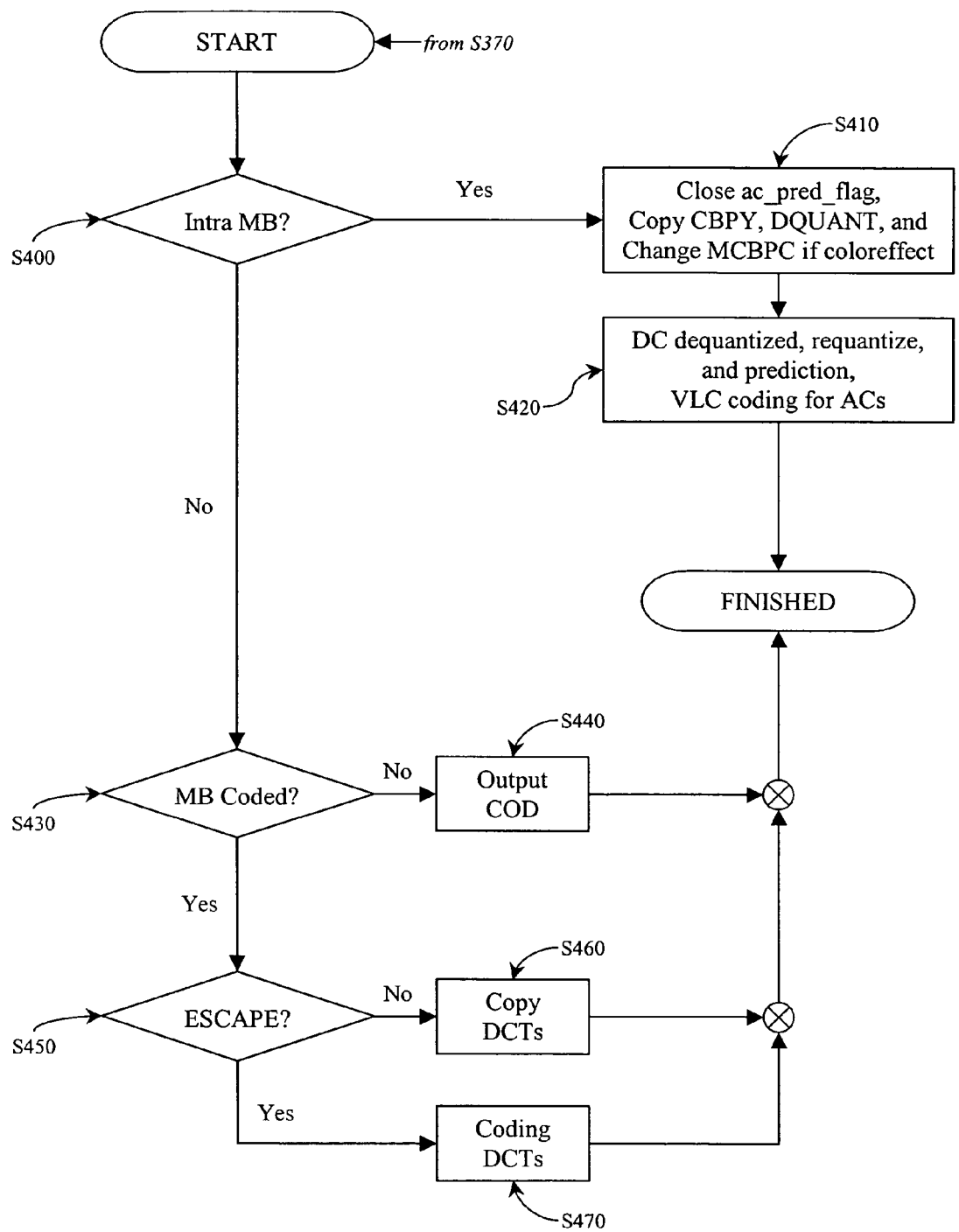
FIG. 4 illustrates a schematic operation sequence for transcoding one MB from H.263 to MPEG-4 format according to an embodiment of the present invention.

Each Macro-Block (MB) is transcoded using one of the following methods in accordance with its coding mode, which is illustrated in FIG. 4, showing a schematic operation sequence for transcoding one Macro-Block (MB) from H.263 to MPEG-4 format according to an embodiment of the present invention.

In operation S400 it is checked whether the Macro-Block (MB) currently operated on is an Intra-MB. In case the check matches, i.e. the MB is an Intra-MB, the operations S410 and 420 are performed. Otherwise, the sequence continues with operation S430. The "ac_pred_flag" is closed in the MB header, i.e. the "AC_pred_flag" indicates if AC/DC prediction is performed, which relates to the (discrete cosine) transform coding of the Macro-Blocks. The CBPY (Coded Block Pattern for luminance) and the DQUANT definition are copied. The CBPY (Coded Block Pattern for luminance) specifies the coded block pattern (CBP) for luminance. DQUANT defines differential values (±1 or ±2) for quantizer to adjust the quantization step size. The MCBPC (Mode and Coded Block Pattern Chrominance) provides the codeword for the coded block pattern for chrominance (CBPC) as well as the information on whether DQUANT is present or not and is adapted if coloreffect (such as Black & White effect) is present. The DC coefficients are dequantized and requantized afterwards followed by the DC prediction. For ACs, after the entropy decoding, the variable-length coding (VLC) is re-performed using the VLC table in MPEG-4 format. The Intra-MB transcoding is then finished.

In operation S430 it is checked whether the Macro-Block (MB) is coded. In case of a coded MB, i.e. the Macro-Block (MB) is an Inter-MB, the sequence branches to operation S450.

The MPEG-4 and H.263 baseline have almost the same Macro-Block (MB) syntax with exception of the ESCAPE coding. Moreover, the Motion Vector (MV) tables in H.263 and MPEG-4 format are almost the same with exception that one extra vector difference is present in MPEG-4 format. In other words, a Motion Vector (MV) table of H.263 format is a subset of MPEG-4 format. In operation S450, it is determined whether ESCAPE coding is present. In case there is no ESCAPE coding present, Motion Vectors (MVs) are copied from the H.263 bitstream and reused. Since MPEG-4 simple profile only supports H.263 quantization, the ACs (which are coefficients of the Discrete Cosine Transform (DCT)) are copied without changing them when there is no ESCAPE coding, as shown in operation S460.

Otherwise, re-coding is required. In operation S470, variable-length decoding (deVLC) and variable-length re-coding (re-VLC) is performed on the Macro-Block in case the (LAST, RUN, LEVEL) is coded in ESCAPE mode. A three dimensional variable length code is used in MPEG-4 to code transform coefficients. An EVENT is a combination of three parameters, LAST, RUN, and LEVEL where:

LAST: 0: There are more nonzero coefficients in the block.
    1: This is the last nonzero coefficient in the block.
RUN: Number of zero coefficients preceding the current nonzero coefficient.
LEVEL: Magnitude of the coefficient.

The most commonly occurring combinations of (LAST, RUN, LEVEL) are coded with variable length codes. The remaining combinations of (LAST, RUN, LEVEL) are coded with a 22 bit word consisting of 1-bit LAST, 6-bit RUN, 8-bit LEVEL and 7-bit fixed length ESCAPE.

In case the MB is not coded (refer to decision in operation S430), the Coded Macro-Block Indication (COD) is copied from the H.263 stream to MPEG-4 stream, in operation S440. The COD (Coded Macro-Block Indication) denotes if the current Macro-Block is coded.

To provide the continuity, when stitching two clips, the time reference of each frame in each video clip needs to be transformed to a common time scale. Since the spliced video is generated from multiple video that may have different coding modes, for ease of processing, some parameters in the VOS (video object sequence) header of the spliced video are fixed. The "vop_time_increment_resolution" is set to a fixed value, and the "fixed_vop_rate" is set to zero. As mentioned earlier, the value of the vop_time_increment_resolution field can be any of the allowable values. One embodiment of the invention uses a value of 30,000. For each VOP of the generated video, the "modulo_time_base" and "vop_time_increment" will be changed according to its time position in the spliced video.

Figure 5:
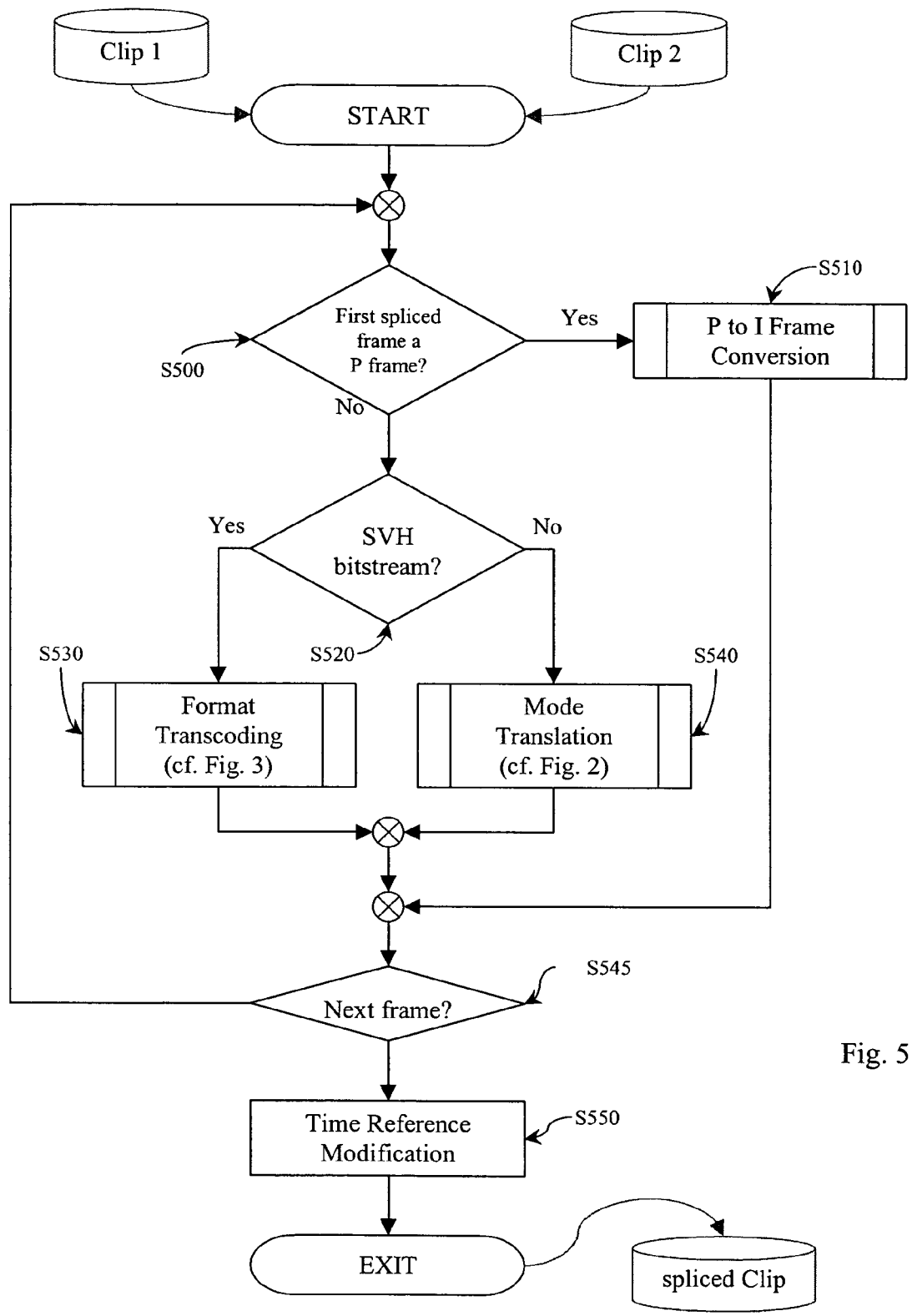
FIG. 5 illustrates schematically the overall architecture of the operation sequence for MPEG-4 simple profile video splicing according to an embodiment of the present invention.
Figure 6:
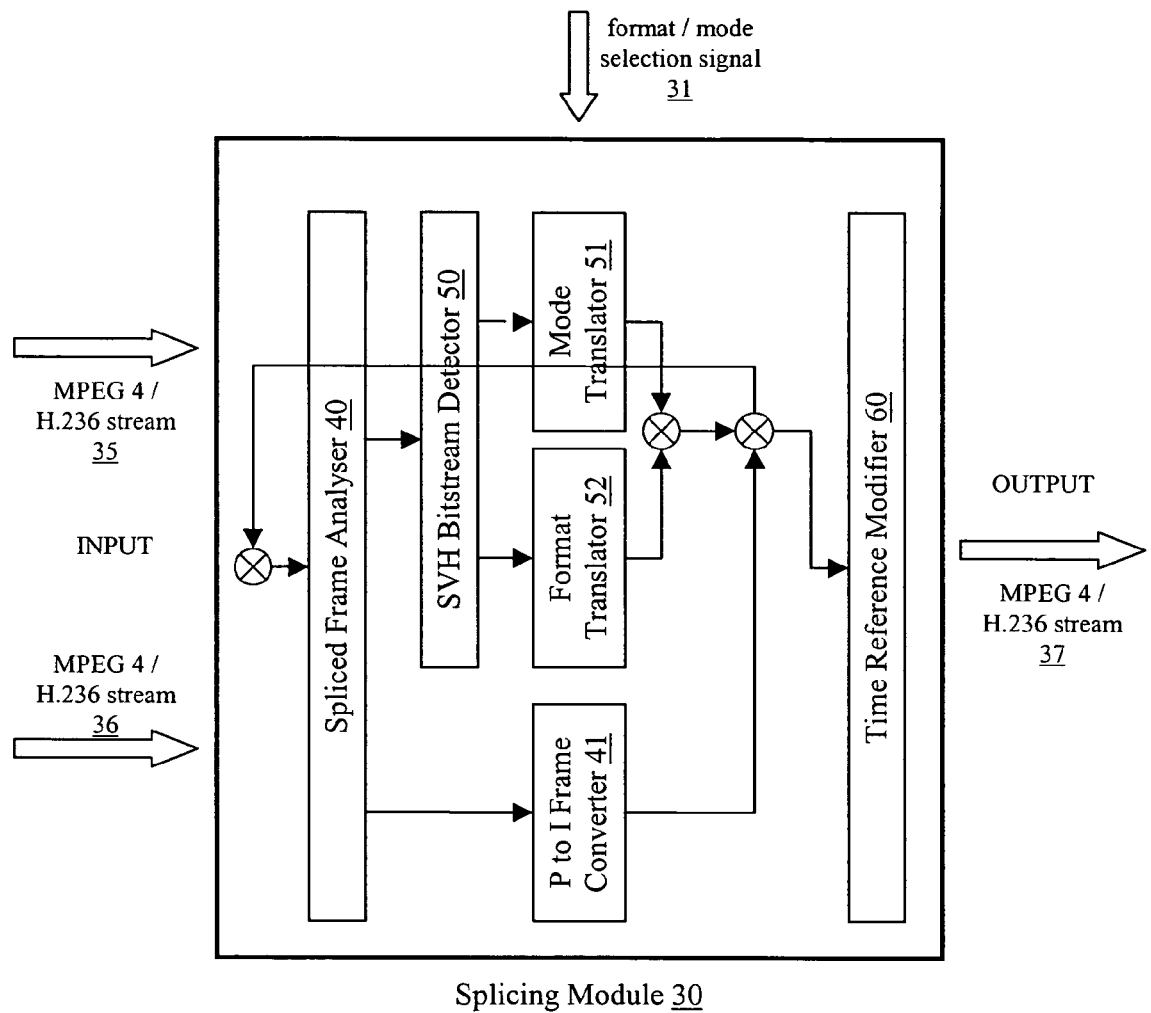
FIG. 6 illustrates schematically the overall architecture of the operation sequence for MPEG-4 simple profile video splicing according to an embodiment of the present invention.

With reference to FIG. 5 the overall architecture of the operation sequence for MPEG-4 simple profile video splicing according to an embodiment of the present invention is illustrated schematically. In completion, FIG. 6 illustrates schematically a splicing module according to an embodiment of the present invention, which enables the operation of the overall operation sequence shown in FIG. 5. References will be given to FIGS. 5 and 6.

MPEG-4 simple profile uses IPPP (Intra, Inter, Inter, Inter, . . . ) structure, in which only I- and several P-frames exist, while B-frames are used. Frame conversion is not required for the first video clip. The irrelevant portion of the data stream is simply discarded. For the following video clips, frame conversion may be needed, depending on its own cutting position at the beginning. When the cut occurs immediately before an I-frame, the video data preceding this frame can be discarded. When the cut occurs before a P-frame, the P-frame must be converted to an I-frame because the P-frame is predicted from its previous I- or P-frame, which is not included in the final spliced video sequence. To perform the frame conversion, the P-frame needs to be decoded and re-encoded as an I-frame. It implies that every frame from the previous I-frame until the current P-frame has to be fully decoded, because each P-frame depends on its previous frame.

Two MPEG-4 simple profile bitstreams (which may have different coding modes and/or formats) are provided for being spliced, i.e., merged together. With reference to FIG. 6, the bitstreams are designated as bitstream 35 and bitstream 36. As aforementioned, the target mode of the resulting spliced MPEG 4 bitstream 37 is selected to be MPEG 4 with packet resynchronization. One of the MPEG-4 bitstreams is a preceding bitstream 35 (i.e. preceding in time), wherein the other one is a subsequent bitstream 36 (following in time). It should be understood, that the two bitstreams 35 and 36 may result from a common original bitstream, which is divided into two or more parts. In case of more than two parts, those remaining undesired parts may be discarded.

In operation S500, it is determined by the frame analyser 40 whether the first spliced frame (of the subsequent bitstream 36) is a P-frame. MPEG-4 simple profile format uses I-frames as well as P-frames. It is to be understood that the cutting (splicing) position may be directly before an I-frame or before a P-frame. Since a P-frame is not an independent frame but depends on information of one or more (P and/or I) frames preceding the P-frame at cutting/splicing position, frame conversion has to be performed in order to convert the P-frame into an I-frame. In operation S510, which is operated when the frame at splicing position (i.e. the first frame) is a P-frame, frame conversion is performed by a P-to-I frame converter 41 resulting in an independent I-frame. The conversion of the P-frame to I-frame results in an I-frame in the bitstream target mode and format. Then, the sequences jumps to operation S550 for further operation.

Otherwise, it is verified in an operation S520 by a SVH detector 50 if a SVH bitstream is present in the bitstream 36.

In case there is not a short video header (SVH) bitstream present, mode translation is performed by a mode translator 51 in an operation S530 and the sequences continues with the operation S545. Refer to FIG. 3 and description referring to FIG. 3 for detailed description of mode translation and the functionality implemented by mode translator 51 executing the mode translation.

Otherwise, a SVH bitstream is not present and the sequence continues with operation S540. The SVH bitstream is transcoded from H.263 to MPEG-4 format by the format translator 52. Refer to FIG. 2 and description referring to FIG. 2 for detailed description of format translation and the functionality implemented by the format translator 52 executing the format translation.

It should be noted that the mode and format translation is applicable with the preceding bitstream 35 and subsequent bitstream 36 supplied to the splicing module 30 executing the overall operation sequence of FIG. 5.

In operation S545, it is checked whether a next frame is to be processed. For a next frame to be processed, the operation sequence returns to operation S500, i.e. the next frame is analysed by the frame analyser 40. Otherwise, the operation sequence continues with operation S550.

Finally, time reference modifications described above in detail are performed by a time reference modifier 60, in the operation S550, and the operation sequence is completed. A spliced bitstream 37 in the target mode and format, in particular packet resynchronization mode and simple profile format composed of the two input MPEG-4 bitstream is finally obtained.

It should be noted that the modules, components, and functionalities, which are described in conjunction with the embodiments of the present invention and which are to be included in the CE device with image capturing capability according to an embodiment of the invention may be constituted by a data processing unit, such as a microprocessor or a microcontroller, which may be comprised by the portable CE device. Further, the modules, components, and functionalities may be constituted by one or more code sections for execution on one or a plurality of data processing units (microprocessors, microcontrollers or application specific integrated circuits (ASIC)), each code section containing instructions for carrying out the processing operations for performing functions and operations described above with reference to operation sequences representing exemplary embodiments of the present invention. Alternatively or additionally, the modules, components, and functionalities or partial functions thereof may be implemented on the basis of one or more hardware modules such as application specific integrated circuits (ASIC). The implementation of the inventive concept is not limited to any specific implementation including software and/or hardware implementation.

What is claimed is:

1. A method, comprising:

providing a compressed first input bitstream and a compressed second input bitstream to be spliced, said first and second input bitstreams being compatible with MPEG-4 simple profile; and performing for each frame in the input bitstreams a mode translation in compressed domain by establishing a Video Object, Video Object Layer, and Video Object Plane with packet resynchronization in an output bitstream;

adjusting a Video Object Plane time increment field for each frame in the input bitstreams to correspond to an output Video Object Plane time increment resolution field;

removing data partitioning, if one of the input bitstreams uses partitioned data error resilience, by obtaining data of a first data partition and a second data partition and rearranging the data of each macro-block; and if one of the input bitstream uses Reversible Variable-Length Codes, re-encoding each macro-block by reversible variable-Length decoding, variable-length encoding each macro-block, and including the macro-block into the output bitstream; otherwise copying transform coefficients included in the macro-block to the output bitstream;

wherein said mode translation in compressed domain is performed for each macro-block in the video packet in the input bit streams and for each video packet in the frame thereof.

2. The method according to claim 1, comprising
performing for each frame in the input bitstreams a format translation in compressed domain by
establishing a Video Object, Video Object Layer, Video Object Plane with packet resynchronization in the output bitstream;
adjusting the Video Object Plane time increment field for each frame in the input bitstreams to correspond to the output Video Object Plane time increment resolution field;
transcoding each macro-block in the frame by
in case of an Intra macro-block, recoding DC and AC transform coefficients of the Intra macro-block and including the recoded coefficients into the output bitstream;
in case of an Inter macro-block without ESCAPE codes, copying the transform coefficients to the output bitstream; and
in case of an Inter macro-block with ESCAPE codes, recoding the variable length codes to enable inclusion of the macro-block into the output bitstream.

3. The method according to claim 2, wherein the transcoding of each macro-block comprises:
in case of an un-coded macro-block, including a Coded Macro-Block Indication into the output bitstream.

4. The method according to claim 2, wherein the recoding of DC and AC transform coefficients comprises:
de-quantizing and re-quantizing the DC coefficients;
performing DC prediction; and
entropy de-coding and variable-length coding the AC coefficients using MPEG-4 variable-length code table.

5. The method according to claim 1, wherein recoding the variable length codes comprises:
variable-length decoding and variable length re-coding the AC transform coefficients in order to remove ESCAPE codes.

6. The method according to claim 1, wherein the format translation comprises:
in case of an un-coded macro-block, including a Coded Macro-Block Indication into the output bitstream.

7. The method according to claim 1, comprising:
adapting time reference, in both Video Object Layer header as well as in such Video Packet Headers that have a Header Extension Code bit enabled, in order to provide for continuity of the spliced bitstream formed of the input bitstreams.

8. The method according to claim 1, comprising:
in case of a P (predictive) frame at spliced position in the second bitstream to be appended to the first bitstream, converting the P-frame to an I-frame to enable splicing of the input frames;
wherein said conversion results in an I-frame having mode and format of the output bitstream.

9. The method according to claim 1, wherein said format translation is performed in case of one of said input bitstreams is a short video header bitstream; otherwise, mode translation is performed.

10. A computer-readable storage medium comprising a micro-controller or micro-processor having computer-executable components, which when executed comprises:
a code section for receiving a compressed first input bitstream and a compressed second input bitstream to be spliced, said first and second input bitstreams being compatible with MPEG-4 simple profile;
a code section for performing for each frame in the input bitstreams a mode translation in compressed domain by
a code section for establishing a Video Object, Video Object Layer, Video Object Plane with packet resynchronization in the output bitstream;
a code section for adjusting a Video Object Plane time increment field for each frame in the input bitstreams to correspond to an output Video Object Plane time increment resolution field;
a code section for removing data partitioning, if one of the input bitstreams uses partitioned data error resilience, by obtaining a first data partition and second data partition and rearranging the data of each macro-block; and
if one of the input bitstream uses reversible variable-length codes, a code section for re-encoding each macro-block by reversible variable-length decoding, variable-length decoding each macro-block, and including the macro-block into the output bitstream; otherwise a code section for copying transform coefficients included in the macro-block to the output bitstream;
wherein said mode translation in compressed domain is performed for each macro-block in the video packet in the input bit streams and for each video packet in the frame thereof.

11. The image data storage module according to claim 10, comprising
a code section for performing for each frame in the input bitstreams a format translation in compressed domain by
a code section for establishing a Video Object, Video Object Layer, Video Object Plane with packet resynchronization in the output bitstream;
a code section for adjusting the Video Object Plane time increment field for each frame in the input bitstreams to correspond to the output Video Object Plane time increment resolution field;
a code section for transcoding each of macro-block in the frame by
in case of an Intra macro-block, a code section for recoding DC and AC transform coefficients of the Intra macro-block and including the recoded coefficients into the output bitstream;
in case of an Inter macro-block without ESCAPE codes, a code section for copying the transform coefficients to the output bitstream; and
in case of an Inter macro-block with ESCAPE codes, a code section for recoding the variable length codes to enable inclusion of the macro-block into the output bitstream.

12. The image data storaae module according to claim 11, wherein the code section for transcoding each macro-block comprises:
in case of an un-coded macro-block, a code section for including a Coded Macro-Block Indication into the output bitstream.

13. The image data storage module according to claim 11, wherein the code section for recoding DC and AC transform coefficients comprises:
a code section for de-quantizing and re-quantizing the DC coefficients;
a code section for performing DC prediction; and
a code section for entropy de-coding and variable-length coding the AC coefficients using MPEG-4 variable-length code table.

14. The image data storage module according to claim 10, wherein the code section for recoding the variable length codes comprises:
a code section for variable-length decoding and variable length re-coding the AC transform coefficients in order to remove ESCAPE codes.

15. The image data storage module according to claim 10, wherein the code section for format translation comprises:
   in case of an un-coded macro-block, a code section for including a Coded Macro-Block Indication (COD) into the output bitstream.

16. The image data storage module according to claim 10, comprising:
   a code section for adapting time reference, in both VOL header as well as in such Video Packet Headers that have a Header Extension Code bit enabled, in order to provide for continuity of the spliced bitstream formed of the input bitstreams.

17. The image data storage module according to claim 10, comprising:
   in case of a P (predictive) frame at spliced position in the second bitstream to be appended to the first bitstream, a code section for converting the P-frame to an I-frame to enable splicing of the input frames;
   wherein said conversion results in an I-frame having mode and format of the output bitstream.

18. The image data storage module according to claim 10, wherein the format translation is performed in case of one of said input bitstreams is a short video header (SVH) bitstream; otherwise, mode translation is performed.

19. A computer-readable storage medium comprising a micro-controller or micro-processor having computer-executable components stored therein, which when executed:
   provide a compressed first input bitstream and a compressed second input bitstream to be spliced;
   perform for each frame in the input bitstreams a mode translation in compressed domain by
   establish a Video Object, Video Object Layer, and Video Object Plane with packet resynchronization in the output bitstream;
   adjust a Video Object Plane time increment field for each frame in the input bitstreams to correspond to an output Video Object Plane time increment field;
   remove data partitioning, if the one of the input bitstreams uses partitioned data error resilience, by obtaining a first data partition and second data partition and rearranges the data of each macro-block; and
   if one of the input bitstream uses Reversible Variable-Length Codes, re-encodes each macro-block by Reversible Variable-Length Decoding, Variable-Length Decoding each macro-block, and includes the macro-block into the output bitstream; otherwise copies transform coefficients included in the macro-block to the output bitstream;
   wherein said mode translation in compressed domain is performed for each macro-block in the video packet in the input bit streams and for each video packet in the frame thereof.

20. A splicing module, comprising:
   an input configured to receive a compressed first input bitstream and a compressed second input bitstream to be spliced, said input bitstreams being compatible with MPEG-4 simple profile; and
   a mode translator configured to perform for each frame in the input bitstreams a mode translation in compressed domain in that
   a Video Object, Video Object Layer, and Video Object Plane with packet resynchronization is established in the output bitstream;
   adjusting a Video Object Plane time increment field for each frame in the input bitstreams to correspond to an output Video Object Plane time increment resolution field;
   data partitioning is removed, if the one of the input bitstreams uses partitioned data error resilience, in that a first and second data partition are obtained and the data of each macro-block is rearranged; and
   if one of the input bitstream uses reversible variable-length codes, each macro-block is re-encoded by Reversible variable-length decoding, variable-length re-coding, and including the macro-block into the output bitstream; otherwise, transform coefficients included in the macro-block are copied to the output bitstream;
   wherein said mode translation in compressed domain is performed for each macro-block in the video packet in the input bit streams and for each video packet in the frame thereof.

21. The module according to claim 20, comprising
   a format translator configured to perform for each frame in the input bitstreams a format translation in compressed domain in that
   a Video Object, Video Object Layer, and Video Object Plane with packet resynchronization is established in the output bitstream;
   a Video Object Plane time increment field for each frame in the input bitstreams is adjusted to correspond to an output Video Object Plane time increment resolution field;
   each macro-block is transcoded in the frame in that
   in case of an Intra macro-block, DC and AC transform coefficients of the Intra macro-block are re-coded and the recoded coefficients are included into the output bitstream;
   in case of an Inter macro-block without ESCAPE codes, the transform coefficients are copied to the output bitstream; and
   in case of an Inter macro-block with ESCAPE codes, the variable length codes are re-coded to enable inclusion of the macro-block into the output bitstream.

22. The module according to claim 21, wherein the transcoding of each macro-block comprises:
   in case of an un-coded macro-block, a Coded Macro-Block Indication is included into the output bitstream.

23. The module according to claim 21, wherein the recoding of DC and AC transform coefficients comprises:
   the DC coefficients are de-quantized and re-quantized;
   DC prediction is performed; and
   the AC coefficients are entropy de-coded and variable-length encoded by using MPEG-4 variable-length code table.

24. The module according to claim 21, wherein recoding the variable length codes comprises:
   the AC transform coefficients are variable-length de-coded and variable length re-coded in order to remove ESCAPE codes.

25. The module according to claim 21, wherein the format translation comprises:
   in case of an un-coded macro-block, a Coded Macro-Block Indication is included into the output bitstream.

26. The module according to claim 20, comprising:
   a time reference modifier for time reference adaptation, in both Video Object Layer header as well as in such Video Packet Headers that have a Header Extension Code bit enabled, in order to provide for continuity of the spliced bitstream formed of the input bitstreams.

27. The module according to claim 20, comprising:
   a frame converter configured to convert the P-frame to an I-frame to enable splicing of the input frames in case of a P (predictive) frame at spliced position in the second bitstream to be appended to the first bitstream; wherein the conversion results in an I-frame having mode and format of the output bitstream.

28. The module according to claim 20, wherein the format translator operates on the input bitstreams in case of one of said input bitstreams is a short video header bitstream; otherwise, mode translator operates on the input bitstreams.

* * * * *

UNITED STATES PATENT AND TRADEMARK OFFICE
CERTIFICATE OF CORRECTION

PATENT NO. : 7,636,395 B2  Page 1 of 1
APPLICATION NO. : 11/081840
DATED : December 22, 2009
INVENTOR(S) : Yongfang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this

Twenty-first Day of December, 2010

David J. Kappos
*Director of the United States Patent and Trademark Office*